US012804220B2

(12) United States Patent
Fang et al.

(10) Patent No.: US 12,804,220 B2
(45) Date of Patent: Nov. 17, 2026

(54) LIVE PREVIEW METHOD AND APPARATUS, AND DEVICE, PROGRAM PRODUCT AND MEDIUM

(71) Applicant: Beijing Zitiao Network Technology Co., Ltd., Beijing (CN)

(72) Inventors: Mengying Fang, Beijing (CN); Xu Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 3 days.

(21) Appl. No.: 18/671,554

(22) Filed: May 22, 2024

(65) Prior Publication Data

US 2024/0314386 A1 Sep. 19, 2024

Related U.S. Application Data

(63) Continuation of application No. PCT/CN2022/132958, filed on Nov. 18, 2022.

(30) Foreign Application Priority Data

Nov. 22, 2021 (CN) ........................ 202111389475.0

(51) Int. Cl.
*H04N 21/2187* (2011.01)
*G06F 3/0485* (2022.01)
*H04N 21/431* (2011.01)

(52) U.S. Cl.
CPC ....... *H04N 21/4312* (2013.01); *G06F 3/0485* (2013.01); *H04N 21/2187* (2013.01)

(58) Field of Classification Search
CPC ............ H04N 21/4312; H04N 21/2187; G06F 3/0485
See application file for complete search history.

(56) References Cited

U.S. PATENT DOCUMENTS 6,118,493 A * 9/2000 Duhault ............ H04N 21/4312 348/E5.104
6,388,714 B1 * 5/2002 Schein .............. H04N 21/2543 348/E7.024

(Continued)

FOREIGN PATENT DOCUMENTS

CN 105847937 A 8/2016
CN 105992068 A 10/2016

(Continued)

OTHER PUBLICATIONS

China National Intellectual Property Administration, Office Action Issued in Application No. 202111389475.0, Jun. 30, 2023, 9 pages.

(Continued)

*Primary Examiner* — Nasser M Goodarzi
(74) *Attorney, Agent, or Firm* — Alleman Hall LLP

(57) ABSTRACT

The embodiments of the present disclosure relate to a live preview method and apparatus, and a device, a program product and a medium. The live streaming preview method includes: displaying a live preview video on a first page, wherein the live preview video is generated based on live streaming, and the first page comprises a triggering element corresponding to additional content associated with the live streaming; and receiving a trigger operation on the triggering element corresponding to the additional content and displaying the additional content.

19 Claims, 8 Drawing Sheets

(56) References Cited

U.S. PATENT DOCUMENTS

| | | | | |
|---|---|---|---|---|
| 6,756,997 | B1 * | 6/2004 | Ward, III | H04N 21/4345 348/E7.071 |
| 6,938,208 | B2 * | 8/2005 | Reichardt | H04N 21/8146 715/721 |
| 7,694,320 | B1 * | 4/2010 | Yeo | G06F 16/739 725/38 |
| 7,984,385 | B2 * | 7/2011 | Ubillos | G11B 27/34 715/793 |
| 8,056,102 | B2 * | 11/2011 | Lee | H04N 21/4316 348/731 |
| 8,849,945 | B1 * | 9/2014 | Desjardins | G11B 27/34 725/35 |
| 9,514,784 | B2 * | 12/2016 | Kim | G11B 19/02 |
| 9,596,502 | B1 * | 3/2017 | Abecassis | H04N 21/43074 |
| 9,749,693 | B2 * | 8/2017 | Yates | H04N 21/47 |
| 9,762,971 | B1 | 9/2017 | Dodge | |
| 10,063,911 | B1 * | 8/2018 | Obara | H04N 21/4223 |
| 10,307,680 | B1 * | 6/2019 | Weinman, Jr. | A63F 13/792 |
| 10,419,786 | B1 * | 9/2019 | Choi | H04N 21/8456 |
| 10,440,436 | B1 * | 10/2019 | Taylor | H04N 21/812 |
| 10,469,896 | B2 * | 11/2019 | Gobara | H04N 21/431 |
| 10,575,045 | B1 * | 2/2020 | Kruse | H04N 21/2393 |
| 10,943,125 | B1 * | 3/2021 | Evans | H04N 21/4788 |
| 11,082,467 | B1 * | 8/2021 | Hartnett | H04L 65/403 |
| 11,172,258 | B1 * | 11/2021 | Tamersoy | G06F 18/22 |
| 11,457,279 | B1 * | 9/2022 | Coleman | H04N 21/632 |
| 11,758,238 | B2 * | 9/2023 | Davies | H04N 21/854 725/32 |
| 11,823,311 | B2 * | 11/2023 | Li | H04N 21/2187 |
| 11,909,921 | B1 * | 2/2024 | Paul | H04M 3/567 |
| 12,063,423 | B1 * | 8/2024 | Neuweg | H04N 21/8541 |
| 12,088,887 | B2 * | 9/2024 | Yang | H04N 21/4316 |
| 12,200,320 | B2 * | 1/2025 | Yoshida | H04N 21/2402 |
| 2007/0288959 | A1 * | 12/2007 | Istvan | H04N 21/4751 725/39 |
| 2010/0145820 | A1 * | 6/2010 | Johnson | G06Q 30/0261 705/26.1 |
| 2010/0153885 | A1 * | 6/2010 | Yates | G06F 16/7867 707/723 |
| 2011/0069940 | A1 * | 3/2011 | Shimy | H04N 21/4532 386/296 |
| 2011/0282906 | A1 * | 11/2011 | Wong | G06F 16/7837 707/E17.03 |
| 2012/0311635 | A1 * | 12/2012 | Mushkatblat | H04N 21/485 725/43 |
| 2013/0031582 | A1 * | 1/2013 | Tinsman | H04N 21/4316 725/36 |
| 2013/0036442 | A1 * | 2/2013 | Wingert | H04N 21/42209 725/60 |
| 2013/0275411 | A1 * | 10/2013 | Kim | G06F 16/532 707/722 |
| 2013/0294755 | A1 * | 11/2013 | Arme | G11B 27/28 386/E5.041 |
| 2014/0258039 | A1 * | 9/2014 | McDevitt | G06Q 30/0603 705/26.61 |
| 2014/0269932 | A1 * | 9/2014 | Su | H04N 21/23439 375/240.25 |
| 2015/0113407 | A1 * | 4/2015 | Hoffert | H04N 21/482 715/720 |
| 2016/0150259 | A1 * | 5/2016 | Sokolov | H04N 21/234309 725/27 |
| 2016/0198214 | A1 * | 7/2016 | Levy | H04N 21/64322 725/43 |
| 2016/0232587 | A1 * | 8/2016 | McDevitt | G06Q 30/0641 |
| 2016/0277802 | A1 * | 9/2016 | Bernstein | H04N 21/44213 |
| 2016/0381427 | A1 * | 12/2016 | Taylor | H04N 21/472 725/13 |
| 2017/0072301 | A1 * | 3/2017 | Abecassis | A63F 9/183 |
| 2017/0270965 | A1 * | 9/2017 | Bao | G06F 40/30 |
| 2017/0289589 | A1 * | 10/2017 | Koumchatzky | H04N 21/251 |
| 2017/0357382 | A1 * | 12/2017 | Miura | G06F 3/04842 |
| 2018/0020243 | A1 * | 1/2018 | Ni | H04N 21/23418 |
| 2018/0025078 | A1 * | 1/2018 | Quennesson | H04N 21/4788 725/141 |
| 2018/0027298 | A1 * | 1/2018 | Paglia | H04N 21/234 725/37 |
| 2018/0095636 | A1 * | 4/2018 | Valdivia | G06F 3/011 |
| 2018/0124477 | A1 * | 5/2018 | Qu | H04N 21/8547 |
| 2018/0146216 | A1 * | 5/2018 | Chang | H04N 21/2187 |
| 2018/0146217 | A1 * | 5/2018 | Kedenburg, III | H04N 21/422 |
| 2018/0234738 | A1 * | 8/2018 | Sarkar | H04N 21/2541 |
| 2018/0262782 | A1 * | 9/2018 | Mateik | H04N 21/84 |
| 2018/0310066 | A1 * | 10/2018 | Kobayashi | G11B 27/322 |
| 2019/0124400 | A1 * | 4/2019 | Wang | H04N 21/2187 |
| 2019/0132650 | A1 * | 5/2019 | Kedenburg, III | H04N 21/4223 |
| 2019/0166412 | A1 * | 5/2019 | Panchaksharaiah | H04N 21/26258 |
| 2019/0179405 | A1 * | 6/2019 | Sun | G06F 1/1686 |
| 2019/0208282 | A1 * | 7/2019 | Singh | H04N 21/4667 |
| 2019/0342507 | A1 * | 11/2019 | Dye | G06T 13/40 |
| 2020/0053401 | A1 * | 2/2020 | Obara | H04N 21/8146 |
| 2020/0186887 | A1 * | 6/2020 | Kwon | G11B 27/34 |
| 2020/0244711 | A1 * | 7/2020 | Engel | H04L 65/60 |
| 2020/0356593 | A1 * | 11/2020 | Azzinnari | G06F 16/64 |
| 2020/0396496 | A1 | 12/2020 | Ding et al. | |
| 2021/0006864 | A1 * | 1/2021 | Xu | H04N 21/2187 |
| 2021/0035559 | A1 * | 2/2021 | Xu | G10L 15/063 |
| 2021/0042724 | A1 * | 2/2021 | Rathod | G07G 1/0054 |
| 2021/0150222 | A1 * | 5/2021 | Evans | H04N 21/251 |
| 2021/0160563 | A1 * | 5/2021 | Nayak | H04N 21/4402 |
| 2021/0185386 | A1 * | 6/2021 | Kong | H04N 21/4394 |
| 2021/0258643 | A1 * | 8/2021 | Park | H04N 21/4756 |
| 2021/0266641 | A1 * | 8/2021 | Selfors | H04N 21/4856 |
| 2021/0281909 | A1 * | 9/2021 | Xiong | H04N 21/2743 |
| 2021/0383130 | A1 * | 12/2021 | Deets | G06V 40/10 |
| 2021/0385417 | A1 * | 12/2021 | Park | G06F 3/0484 |
| 2022/0070504 | A1 * | 3/2022 | Hartnett | H04N 21/21805 |
| 2022/0070514 | A1 * | 3/2022 | Li | H04N 21/47815 |
| 2022/0167036 | A1 * | 5/2022 | Lin | H04N 21/25866 |
| 2022/0191594 | A1 * | 6/2022 | Devoy, III | G06Q 20/384 |
| 2022/0239988 | A1 * | 7/2022 | Yang | H04N 21/2187 |
| 2022/0295040 | A1 * | 9/2022 | Jayaram | G06T 7/73 |
| 2022/0321371 | A1 * | 10/2022 | Lin | G06F 3/167 |
| 2022/0366389 | A1 * | 11/2022 | Parker | G06Q 10/1093 |
| 2022/0383394 | A1 * | 12/2022 | Anerella | H04N 21/2187 |
| 2022/0394333 | A1 * | 12/2022 | Li | H04N 21/47202 |
| 2022/0394344 | A1 * | 12/2022 | Xie | H04N 21/4788 |
| 2022/0417473 | A1 * | 12/2022 | Davidson | H04N 7/56 |
| 2023/0115250 | A1 * | 4/2023 | Scallon | G06F 3/0482 715/204 |
| 2023/0224545 | A1 * | 7/2023 | Deng | H04L 65/611 725/93 |
| 2023/0276078 | A1 * | 8/2023 | Li | H04N 21/2743 725/105 |
| 2023/0283813 | A1 * | 9/2023 | Briggs | H04N 21/2665 709/231 |
| 2023/0318997 | A1 * | 10/2023 | Rathod | H04N 21/254 709/203 |
| 2024/0089528 | A1 | 3/2024 | Fang et al. | |
| 2024/0095792 | A1 * | 3/2024 | McDevitt | G06Q 30/0623 |

FOREIGN PATENT DOCUMENTS

| | | | |
|---|---|---|---|
| CN | 106790120 | A | 5/2017 |
| CN | 108024083 | A | 5/2018 |
| CN | 109413483 | A | 3/2019 |
| CN | 109618177 | A | 4/2019 |
| CN | 109951724 | A | 6/2019 |
| CN | 110087119 | A | 8/2019 |
| CN | 110740339 | A | 1/2020 |
| CN | 111147878 | A | 5/2020 |
| CN | 111327917 | A | 6/2020 |
| CN | 111629251 | A | 9/2020 |
| CN | 111954020 | A | 11/2020 |
| CN | 112258232 | A | 1/2021 |
| CN | 113065021 | A | 7/2021 |
| CN | 113132787 | A | 7/2021 |
| CN | 113301421 | A | 8/2021 |

(56) References Cited

FOREIGN PATENT DOCUMENTS

| | | | |
|---|---|---|---|
| CN | 113365136 | A | 9/2021 |
| CN | 114071179 | A | 2/2022 |
| EP | 2747438 | A2 | 6/2014 |

OTHER PUBLICATIONS

China National Intellectual Property Administration, Search Report Issued in Application No. 202111389475.0, Jun. 30, 2023, 5 pages.

ISA China National Intellectual Property Administration, International Search Report Issued in Application No. PCT/CN2022/132958, Jan. 18, 2023, WIPO, 6 pages.

European Patent Office, Extended European Search Report Issued in Application No. 22894971.5, Jan. 27, 2025, Germany, 10 pages.

* cited by examiner

LIVE PREVIEW METHOD AND APPARATUS, AND DEVICE, PROGRAM PRODUCT AND MEDIUM

CROSS-REFERENCE TO RELATED APPLICATIONS

The present disclosure is based on and claims the benefit of Chinese Patent Application for invention No. 202111389475.0, filed on Nov. 22, 2021, the disclosure of which is hereby incorporated into this disclosure by reference in its entirety.

TECHNICAL FIELD

The present disclosure relates to the technical field of live streaming, in particular to a live preview method and apparatus, a device, a program product and a medium.

BACKGROUND

With the development of live stream technology, watching live shows has become an increasingly popular form of entertainment in our daily lives.

In live apps, by displaying live preview feeds to users, users can select and enter live rooms of interest.

SUMMARY

An embodiment of the present disclosure provides a live preview method, comprising:

- displaying a live preview video on a first page, wherein the live preview video is generated based on live streaming, and the first page comprises a triggering element corresponding to additional content associated with the live streaming; and
- receiving a trigger operation on the triggering element corresponding to the additional content and displaying the additional content.

An embodiment of the present disclosure further provides a live preview apparatus, comprising:

- a preview module for displaying a live preview video on a first page, wherein the live preview video is generated based on live streaming, and the first page comprises a triggering element corresponding to additional content associated with the live streaming;
- an additional content module for receiving a trigger operation on the triggering element corresponding to the additional content and displaying the additional content.

An embodiment of the present disclosure provides an electronic device, comprising: a processor; a memory for storing processor executable instructions, wherein the processor is used to read the executable instructions from the memory and execute the instructions to implement the live preview method provided in the embodiments of the present disclosure.

An embodiment of the present application further provides a non-transitory computer program product containing a computer program or instructions, wherein the computer program or instructions, when executed by a processor, implement the live preview method of the present disclosure.

An non-transitory embodiment of the present disclosure further discloses a computer-readable storage medium having stored thereon a computer program, wherein the computer program is used to perform the live preview method provided in the embodiments of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
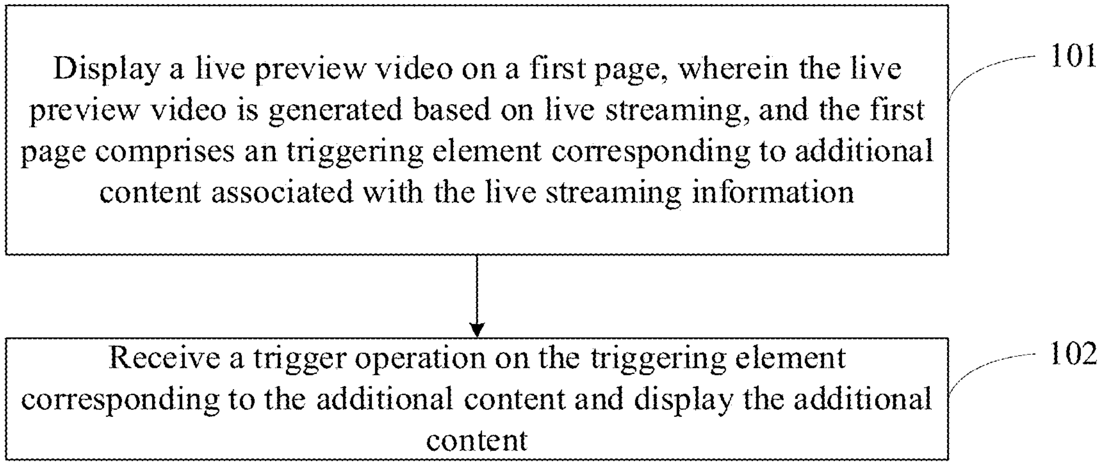
FIG. 1 is a flowchart of a live preview method provided in an embodiment of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "an embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

Live apps allow users to choose and enter live rooms they are interested by presenting live preview feed to users. However, consumption in the live preview feed scenario is a quick decision-making scenario, and the information displayed to users in a live preview feed is limited. If users are not engaged, they will quickly swipe away the preview, and the live content cannot be effectively communicated to users, resulting in a poor display effect of the live preview feed, unable to meet users' related interest demands, and causing a poor user experience. To address the above issues, an embodiment of the present disclosure provides a live preview method, which will be introduced in conjunction with specific embodiments below.

FIG. 1 is a schematic flowchart of a live preview method provided in an embodiment of the present disclosure. The method can be executed by a live preview apparatus, wherein the apparatus can be implemented by at least one of software or hardware, and can generally be integrated in an electronic device. As shown in FIG. 1, the method comprises the following steps.

In Step 101, displaying a live preview video on a first page, wherein the live preview video is generated based on live streaming, and the first page comprises a triggering element corresponding to additional content associated with the live streaming.

In some embodiments, the live preview video may be displayed after the live preview video is obtained.

In some embodiments, the live preview video may comprise an triggering element corresponding to additional content associated with the live streaming.

The live preview video can be a video clip used to represent the live streaming such as live content of a live room (a live streaming room or a live streaming channel), and live content preview can be achieved by means of this video clip. The live preview video can be generated based on the live streaming in a suitable manner, which is not specifically limited in this embodiment. For example, the live content can be used as the live preview video or the live preview video can be generated by cropping the live streaming (live content). In some embodiments, the first page may be a preview feed page or a preview page. The preview feed page can be a page in an app used to display a live preview feed to users, and a plurality of live preview videos can be displayed on this feed page.

The above additional content may be content associated with the live streaming. In an embodiment of the present application, the additional content may comprise at least one of a historical predefined video clip, an object (such as an object to be introduced), and a live room, wherein the live room in the additional content may be a first live room associated with a second live room, wherein the second live room corresponds to the live streaming. For example, the live room in the additional content may be associated with the live content of the second live room. The historical predefined video clip can be understood as an exciting video clip or highlight video clip of live content of the live room. The object can be a product showcased in an e-commerce's live room, for example, the object can be an object to be introduced. The first live room associated with the second live room can be a live room that has an attribute associated with the current second live room.

In an embodiment of the present disclosure, an triggering element corresponding to the additional content is added to the live preview video, through which the display of the additional content can be achieved. The triggering element corresponding to the additional content is identification information of the additional content, which can be information that can represent the additional content. Different additional content has different identification information, i.e., identification information of a piece of additional content is different from identification information of another piece of additional content. In response to the additional content being a historical predefined video clip, the corresponding triggering element corresponding to the additional content can be the introduction information of the historical predefined video clip, which can particularly comprise the duration and introduction text of the historical predefined video clip, etc.; in response to the additional content being an object, the corresponding triggering element corresponding to the additional content can be preview information of the object, which can be a name of the object, etc.; in response to the additional content being a first live room associated with the second live room, the corresponding triggering element corresponding to the additional content can be tag association information of the first live room, which can be generated based on tag (s) of the current second live room.

Particularly, after receiving a user's live preview trigger operation, a client can obtain a live preview video related to the user from a server and play the live preview video on the first page. As the live preview video comprises an triggering element corresponding to the additional content, the triggering element corresponding to the additional content can also be displayed on the first page described above. Optionally, the display position of the triggering element corresponding to the additional content on the first page is not specifically limited herein. As an example, the triggering element corresponding to the additional content can be displayed in a bottom area of the first page.

The display of the additional content and the triggering element corresponding to the additional content depends on the type of the live preview video. For a live preview video or its corresponding live room of an object promotion type, the additional content is an object, and the triggering element corresponding to the additional content is identification information of the object; for a live preview video or its corresponding live room of a video viewing type, the additional content can be a historical predefined video clip, and the triggering element corresponding to the additional content is identification information of the historical predefined video clip; for a live preview video or its corresponding live room of any type, the additional content can be a first live room associated with the second live room, and the triggering element corresponding to the additional content is identification information of the first live room associated with the second live room.

Figure 2:
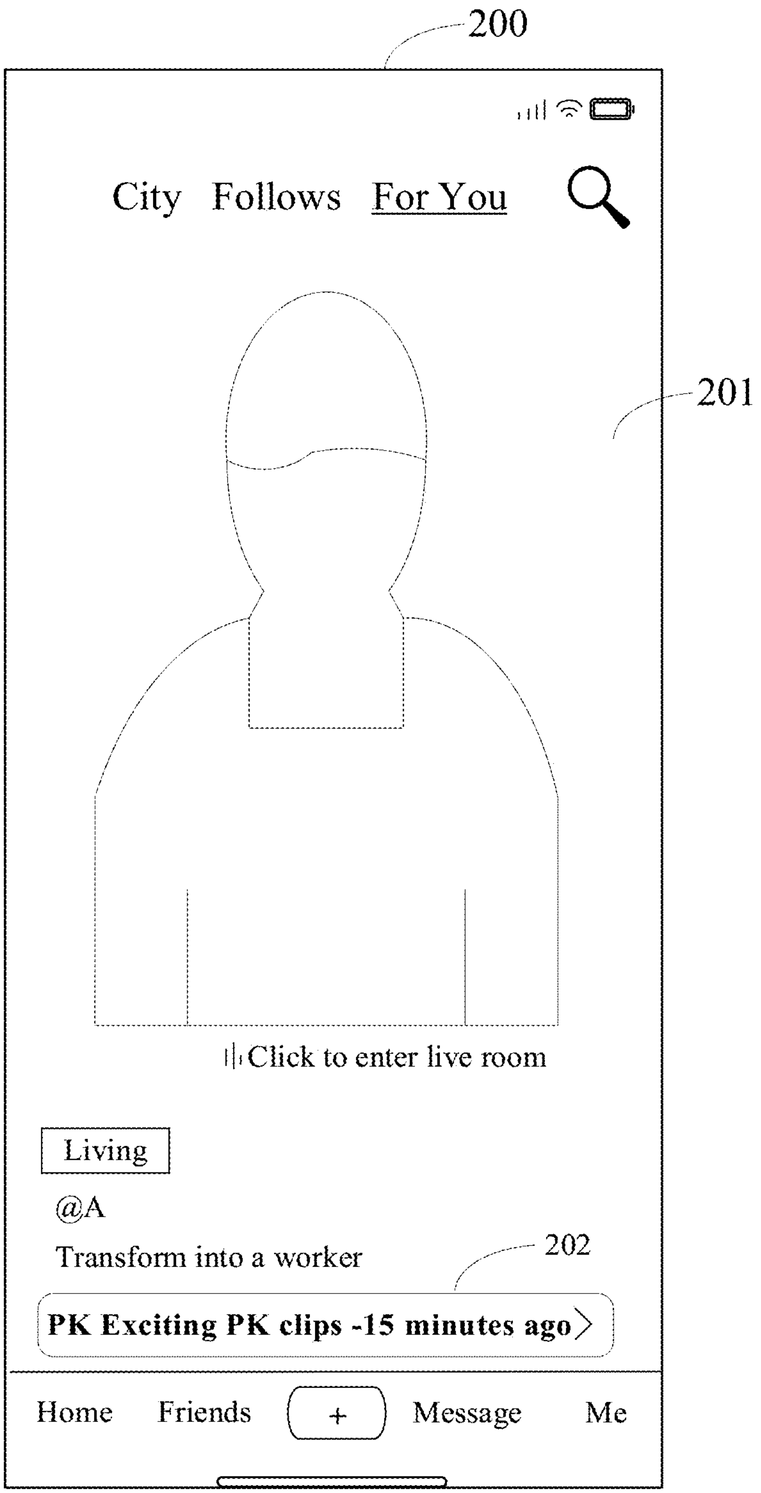
FIG. 2 is a schematic diagram of a feed page provided in an embodiment of the present disclosure.

Exemplarily, FIG. 2 is a schematic diagram of a feed page provided in an embodiment of the present application. As shown in FIG. 2, a schematic diagram of a feed page 200 is shown, on which a live preview video 201 and relevant content of a live room corresponding to the live preview video can be displayed, such as "Host A" and the live title "Transform into a worker" in the figure. An triggering element 202 corresponding to the additional content may be further displayed in a bottom area of the preview feed page 200. Here, the corresponding additional content is a historical predefined video clip. This triggering element 202 is provided as introduction information of the historical predefined video clip, such as "PK Exciting PK clips −15 minutes ago" as shown in the figure.

Therefore, during a live procedure (after the start and before the end of the live), a highlight video is generated based on the completed live content as a predefined video clip, and the predefined video clip is displayed in a first page (such as a live preview feed page) corresponding to the video preview feed on a recommendation page, thereby facilitating users to obtain more comprehensive information related to the live when browsing on the recommendation page to accurately determine whether to enter the live room and view the highlight video, so as to achieve better compliance with user expectations and improved user experience.

It can be understood that the triggering element 202 corresponding to additional content in FIG. 2 is only an example. In response to the additional content being an object to be introduced, the triggering element 202 can be provided as the name of the object to be introduced, such as "Autumn/Winter Long Dress"; in response to the additional content being a live room associated with the live content, the triggering element 201 can be provided as tag association information of the live room associated with the live content, such as "Related Lives • Festival Live Special Session".

Therefore, by displaying a first page in the live preview feed on a recommendation page, it is convenient for users to have a more comprehensive access to an object to be introduced in the live preview video, such as its product information, so as to more accurately determine whether to enter the live room and view the live product.

In Step 102, a trigger operation on the triggering element corresponding to the additional content is received and the additional content is displayed.

The trigger operation can comprise a gesture control operation (such as clicking, long pressing, double clicking, etc.) on the triggering element corresponding to the additional content, a voice control operation, or a facial expression control operation performed by a user, which is not specifically limited in the embodiments of the present disclosure.

Specifically, after displaying the live preview video on the first page, the client can display the additional content that corresponds to the current triggering element corresponding to the additional content after receiving the user's trigger operation on the triggering element corresponding to the additional content. The specific display method can vary depending on the additional content.

By adding an triggering element corresponding to the additional content in the first page, it is possible to deliver additional content associated with the current live preview video, so as to expand the content displayed in the live preview feed, enhance user interaction, and allow users to browse more related content while watching the live preview video, thereby improving the display effect of the live preview feed, satisfying users' related interest demands, and enhancing the live preview experience.

Compared to the provision of additional content in live rooms in the related art, this solution expands the distribution scenarios and distribution flexibility, shortens the path to obtain additional content, and better satisfies the exploration needs of users. It can achieve a better traffic driving effect and a better presentation effect, enhance the value of the live preview feed, and facilitate the selection of live content for users in mixing scenes. It allows users to fully experience the ecological diversity of live streaming and can fully meet their related interest demands.

Figure 3:
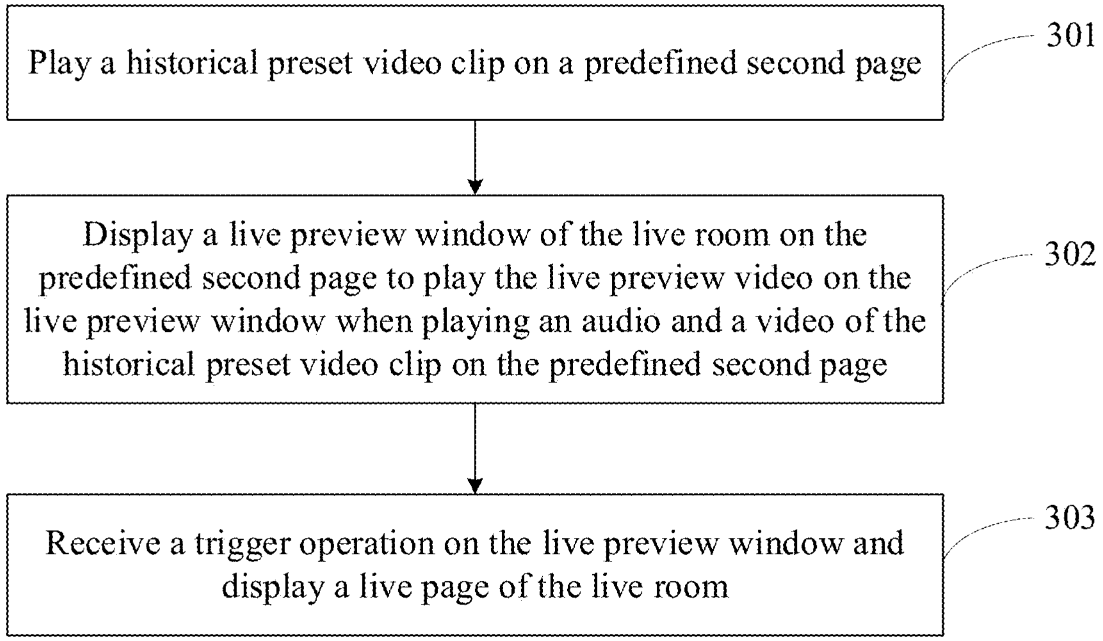
FIG. 3 is a flowchart of another live preview method provided in an embodiment of the present disclosure.

As an example, FIG. 3 is a flowchart of another live preview method provided in an embodiment of the present application. As shown in FIG. 3, in an embodiment, in response to the additional content is a historical predefined video clip, displaying the additional content may comprise the following step 301, and steps 302 to 303 may be executed after step 301.

In Step 301, a historical predefined video clip is played on a predefined second page.

In some embodiments, the second page is a landing page. The predefined landing page can be a new page used to display a historical predefined video clip in the additional content, which is different from the first page described above.

Optionally, the historical predefined video clip is a predefined video clip of the live content of the live room captured within a predefined historical time period prior to a current time. The predefined historical period can be set according to the actual situation. For example, it can be set to 30 minutes, which means that the historical predefined video clip is a highlight video clip of the live content captured 30 minutes before the current time.

Optionally, in response to multiple predefined video clips being within the predefined historical time period, the historical predefined video clip is a predefined video clip closest to the current time. That is, in response to multiple predefined video clips being within the predefined historical time period described above, only the predefined video clip closest to the current time can be displayed.

Since a live event may last for a long period of time, there may be many predefined video clips. In the present disclosure, the historical predefined video clip is designated within a certain period of historical time and may be further designated as the predefined video clip closest to the current moment to avoid the need to select from a plurality of predefined video clips, thereby improving the efficiency of later displaying the historical predefined video clip.

After receiving the user's trigger operation on the triggering element corresponding to the additional content, the client can jump from the first page to a predefined second page to play back the historical predefined video clip on the predefined second page, and display basic information of the historical predefined video clip. For example, in response to the historical predefined video clip being a highlight clip, the basic information can be a highlight category and highlight description. Optionally, when the playback of the historical predefined video clip is finished, it can be automatically played back again.

Figure 4:
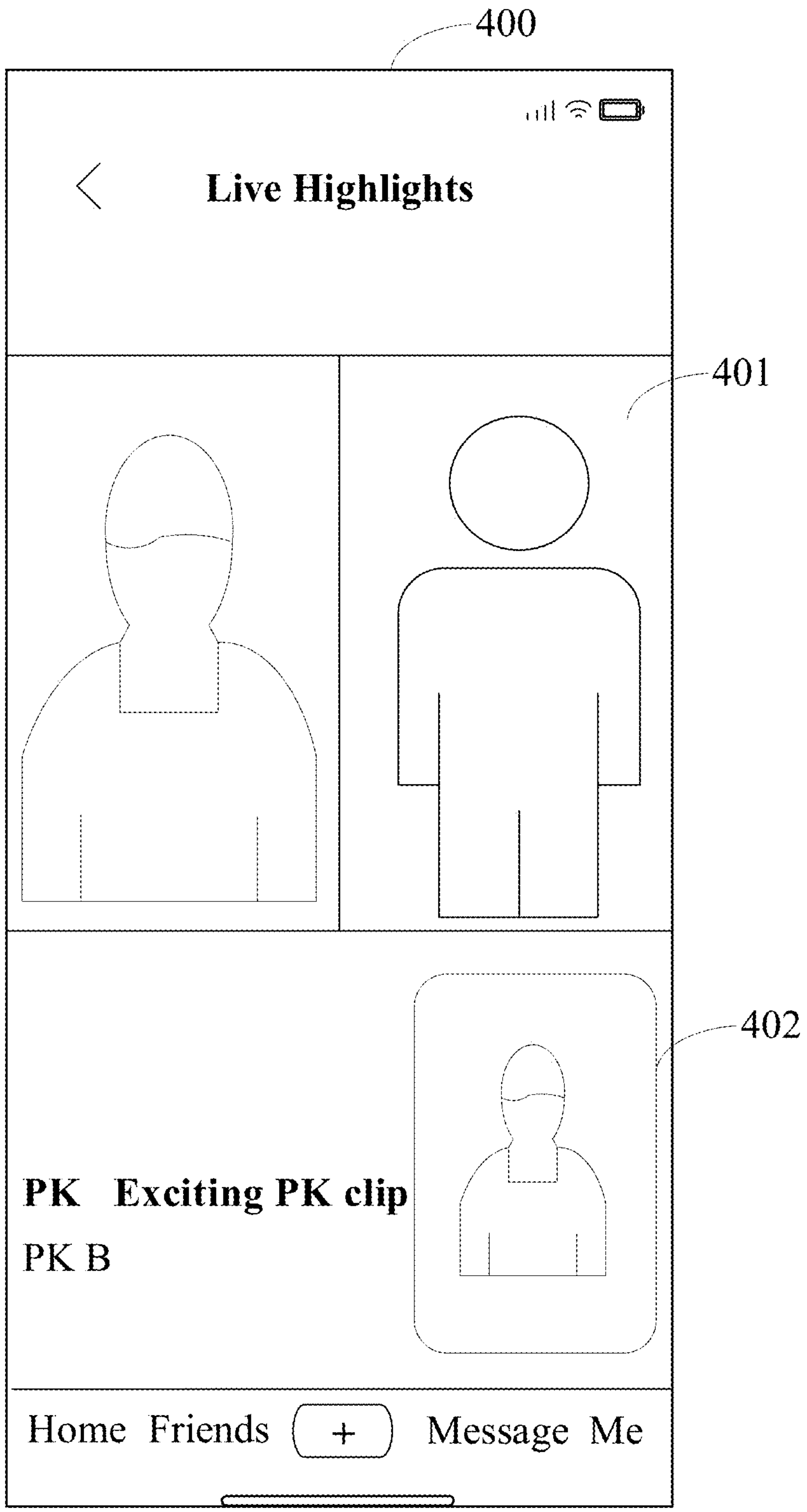
FIG. 4 is a schematic diagram of a predefined landing page provided in an embodiment of the present disclosure.

As an example, FIG. 4 is a schematic diagram of a predefined landing page provided in an embodiment of the present disclosure. As shown in FIG. 4, a schematic diagram of a predefined landing page 400 is shown, on which a historical predefined video clip 401 can be displayed. As an example, the historical predefined video clip 401 is a highlight clip, such as an exciting PK clip of A and B shown in the figure. The predefined landing page 400 can also display basic information such as a title "Live Highlights", a highlight category "PK", and a highlight description "PK B".

It can be understood that historical predefined video clip may be varied depending on the live category. For example, in response to the live content being singing or karaoke, the historical predefined video clip can be a singing clip of the host; in response to the live content being dancing, the historical predefined video clip can be the host's dancing video clip; in response to the live content being a game, the historical predefined video clip can be a video clip of the host playing a game; in response to the live content being an introduction to game functions, the historical predefined video clip can be a video clip showing the host's operations; in response to the live content being e-commerce, the historical predefined video clip can be a video clip featuring a popular product; in response to the live content is props, the historical predefined video clip can be a video clip with exciting special effects; in response to the live content being a PK show, the historical predefined video clip can be an exciting PK clip.

After step 301, step 302 or steps 302 and 303 can be performed.

In Step 302, a live preview window of the live room is displayed on the predefined second page to play the live preview video on the live preview window when playing an audio and a video of the historical predefined video clip on the predefined second page.

The live preview window can be a floating window used to display the live streaming, for example, live content of the live room. The live preview window can be displayed on the predefined second page described above, and its specific position is not limited herein. Moreover, the live preview window can only display images without sound.

In some embodiments, the client may play the historical predefined video clip in the predefined second page when playing the live preview window on the predefined second page. Because the video images and audio of the historical predefined video clip are being played, the live preview window displays only images of the live content without sound so as not to interfere with the playback of the historical predefined video clip.

For example, as shown in FIG. 4, a live preview window 402 may be further displayed on the predefined landing page 400. In this live preview window 402, only images of the live content of the live room may be displayed without sound being played.

In Step 303, a trigger operation on the live preview window is received and a live page of the live room is displayed.

The trigger operation on the live preview window can include a user's gesture control operation, a voice control operation, or a facial expression control operation on the live preview window, which is not specifically limited herein.

In some embodiments, after the live preview window is displayed on the predefined second page, the client can detect the user's trigger operation. In response to a trigger operation performed by the user on the live preview window being detected, the user can be directed to a live page displaying a live room, i.e., the user enters the live room to view the live content.

Figure 5:
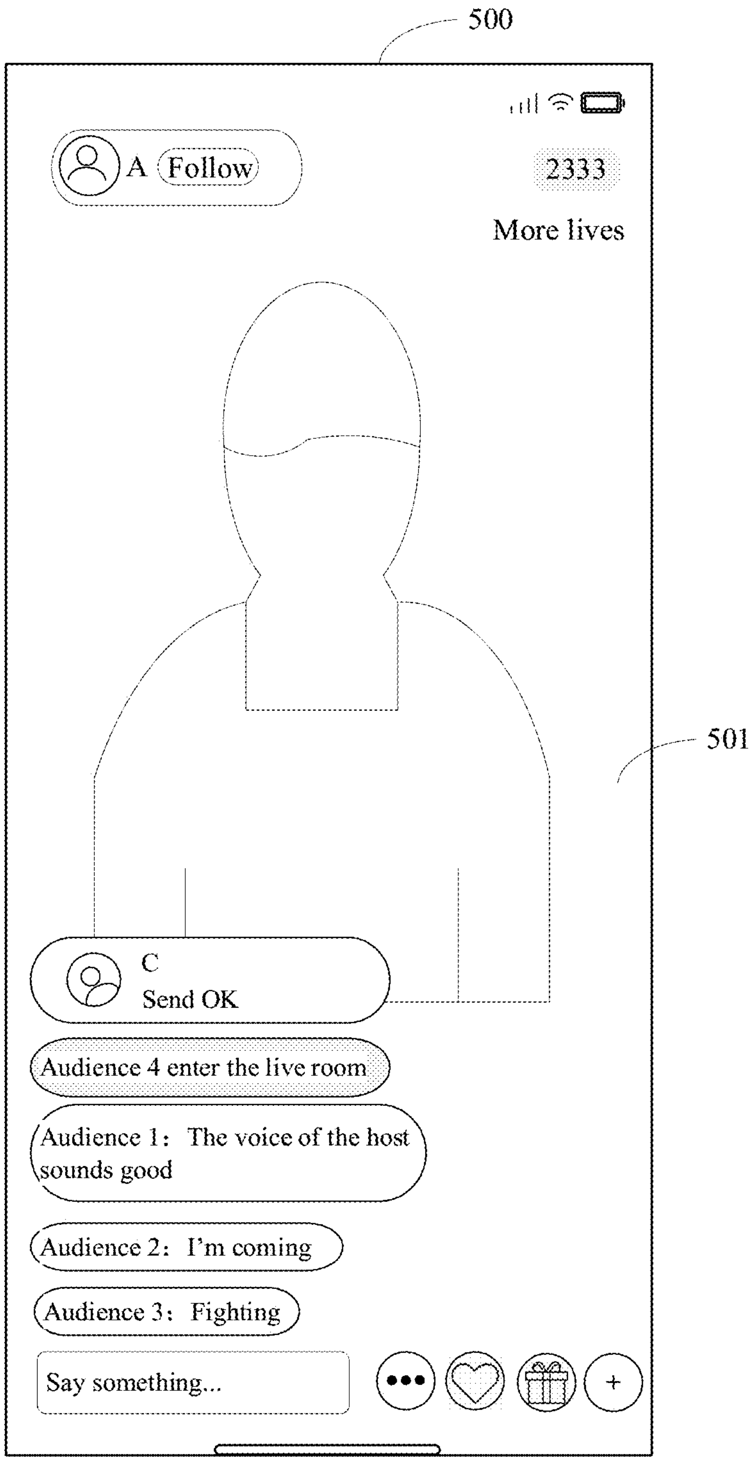
FIG. 5 is a schematic diagram of live page provided by an embodiment of the present disclosure.

Exemplarily, FIG. 5 is a schematic diagram of a live page provided in an embodiment of the present disclosure. As shown in FIG. 5, a schematic diagram of a live page 500 is shown, on which can live content 501 of a live room can be displayed. The live content 501 corresponds to the live preview window 402 in FIG. 4. In response to the user triggering the live preview window 402 in FIG. 4, the live page 500 can be displayed. The live page 500 can also display interactive messages of audiences entering the live room, for example.

In the above scheme, in response to the additional content being a historical predefined video clip, after the user triggers the triggering element corresponding to the additional content, a predefined second page is entered to play the historical predefined video clip, allowing the user to quickly view the highlights of the live room. In addition, a quick entry to the live room can also be displayed to allow the user to quickly enter the live room, thus expanding the presentation content and value of the live preview feed.

In another implementation, in response to the additional content being an object, displaying the additional content may comprise: displaying attribute information of the object on an object detail page, the attribute information comprising at least one of an image or an introduction text of the object.

The object detail page can be a page used to display relevant information about the live objects in the additional content, which can be regarded as a product detail page and is different from the first page described above.

In some embodiments, the client may display the object detail page in response to detecting a user triggering the triggering element corresponding to the additional content. The object detail page can be displayed in full screen or at a smaller size on the first page. For example, the object detail page can be displayed in half-screen on the feed page, and the attribute information of the object can be displayed on the object detail page. The attribute information of the object can include related information such as an image or an introduction text of the object. For example, in response to the object being a face cream, the attribute information may include the brand, price, an introduction text to the face cream, or other related content.

Figure 6:
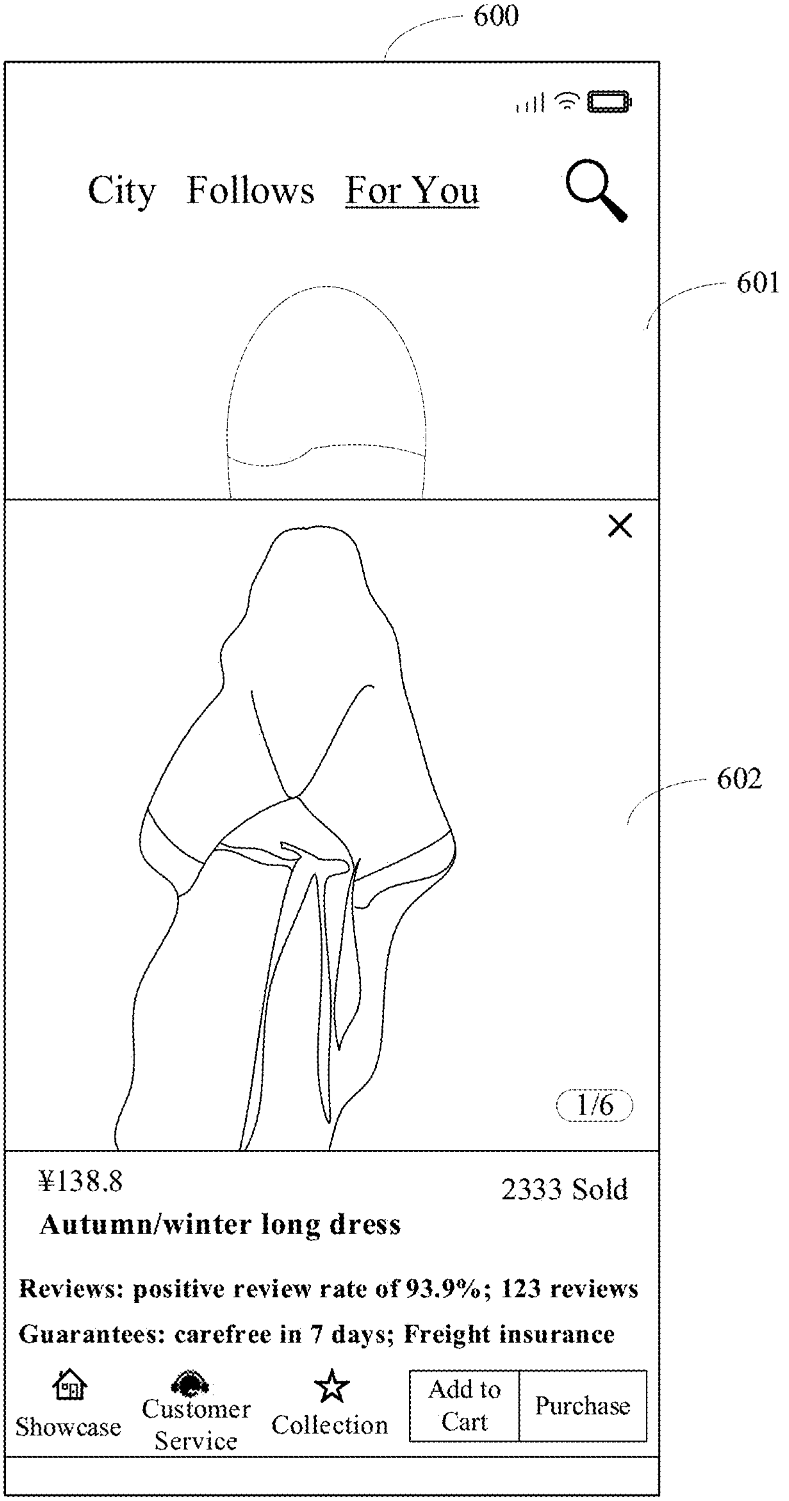
FIG. 6 is a schematic diagram of an object detail page provided by an embodiment of the present disclosure.

For example, FIG. 6 is a schematic diagram of an object detail page provided in an embodiment of the present disclosure. As shown in FIG. 6, an object detail page 602 is displayed on the preview feed page 600 in a half-screen format. A live preview video 601 can be displayed on the preview feed page 600. The object detail page 602 can display images and introduction texts of the object to be introduced. For example, FIG. 6 shows an object to be introduced, i.e., a product "Dress", and shows a picture of the dress, with a product name "Autumn/winter long dress", a product price "¥ 138.8", and product review information "positive review rate of 93.9%; 123 reviews", and transaction information "sold 2333", as well as other guarantee information and function buttons, including a Purchase button, a Showcase button, Customer Service button and a Collection button, so that the user can perform some operations based on the displayed product information. The size of the object detail page 602 is smaller than the preview feed page 600, and its specific size can be set according to the actual situation.

Optionally, the live content of the live room (the second live room) can also be displayed on the object detail page described above. As an optional implementation, the object detail page can be regarded as a live page that displays the live content of a live room. On the object detail page, a detail card can be provided, which is smaller than the live page and covers a portion of the live page. The attribute information of the object can be displayed in the detail card. In response to a close operation for closing the detail card being received from the user, the live content of the live room can be displayed in full screen. As another optional implementation, in response to the attribute information of the object being displayed on the object detail page, the live content of the live room can be displayed in a live preview window. Similar to the live preview window on the predefined second page described above, a live page of the live room can be displayed when the user's trigger operation on the live preview window is received. The above two ways are only examples. By displaying a quick entry to the live room on the object detail page, users can quickly enter the live room and watch the live content.

In the above scheme, in response to the additional content being an object, after a user triggers the triggering element corresponding to the additional content, the object detail page can be launched to display the attribute information of the object. This allows users to quickly understand the object to meet their exploration needs, thereby enhancing the presentation content and value of the live preview feed.

In another implementation, in response to the additional content being one or more live rooms associated with the live streaming, displaying the additional content may comprise: displaying live cards of the one or more live rooms associated with the second live room on the first page.

A live card can represent a first live room associated with the second live room in the form of a card, which can include relevant information about the first live room associated with the second live room. For example, a live card can include at least one of a live room cover, a host avatar, a host nickname, a live room title, and other information of the first live room associated with the second live room. The number of first live rooms associated with the second live room can be one or more, which is not specifically limited herein.

The first live room associated with the second live room can be a live room that has an attribute associated with the current second live room, and can be filtered based on the label or type of the live room. If the additional content is a first live room associated with the second live room, the triggering element corresponding to the additional content can be generated based on the label of the current live room. For example, the live room can have a relation label, such as "Your Follows", "Your Friends", "Recently Seen", "viewing/viewed by X Friends", etc. In this case, the triggering element corresponding to the additional content can be set up with a prompt message, such as "Related Lives • xxx you followed is now live streaming". If the live room has a platform label such as "top X in xx region" or a City label "xx City", the triggering element corresponding to the additional content can be set up with a prompt message "Related Lives • More exciting lives in region A|xxx people are viewing", where region A is the user's location. If the live room has a "Hot Lives" label, the triggering element corresponding to the additional content can be set up with a prompt message such as "Related Lives • More Hotspots|xxx People are viewing". If the live room has a "Top X Sales" label, the triggering element corresponding to the additional content can be set up with a prompt message such as "Related Lives • More Popular Products|xxx people are buying". If the live room is a holiday promotion live room without a label, the live rooms associated with the live content can be filtered based on the holiday promotion activities. In this case, the triggering element corresponding to the additional content can be set up with a prompt message such as "Holiday live welfare session", and a corresponding visual icon can be provided.

In some embodiments, after detecting a user's trigger operation on the triggering element corresponding to the additional content, the client can display live cards for the live rooms associated with the second live room on the first page, and the live cards can cover a portion of the live preview video. The specific display location and arrangement of live cards are not limited herein. For example, live cards can be displayed side by side in a bottom area of the first page. The first page supports the display of at least one and up to a predefined number of live cards, for example, five live cards, which means that a maximum of five live cards can be displayed on the first page.

Figure 7:
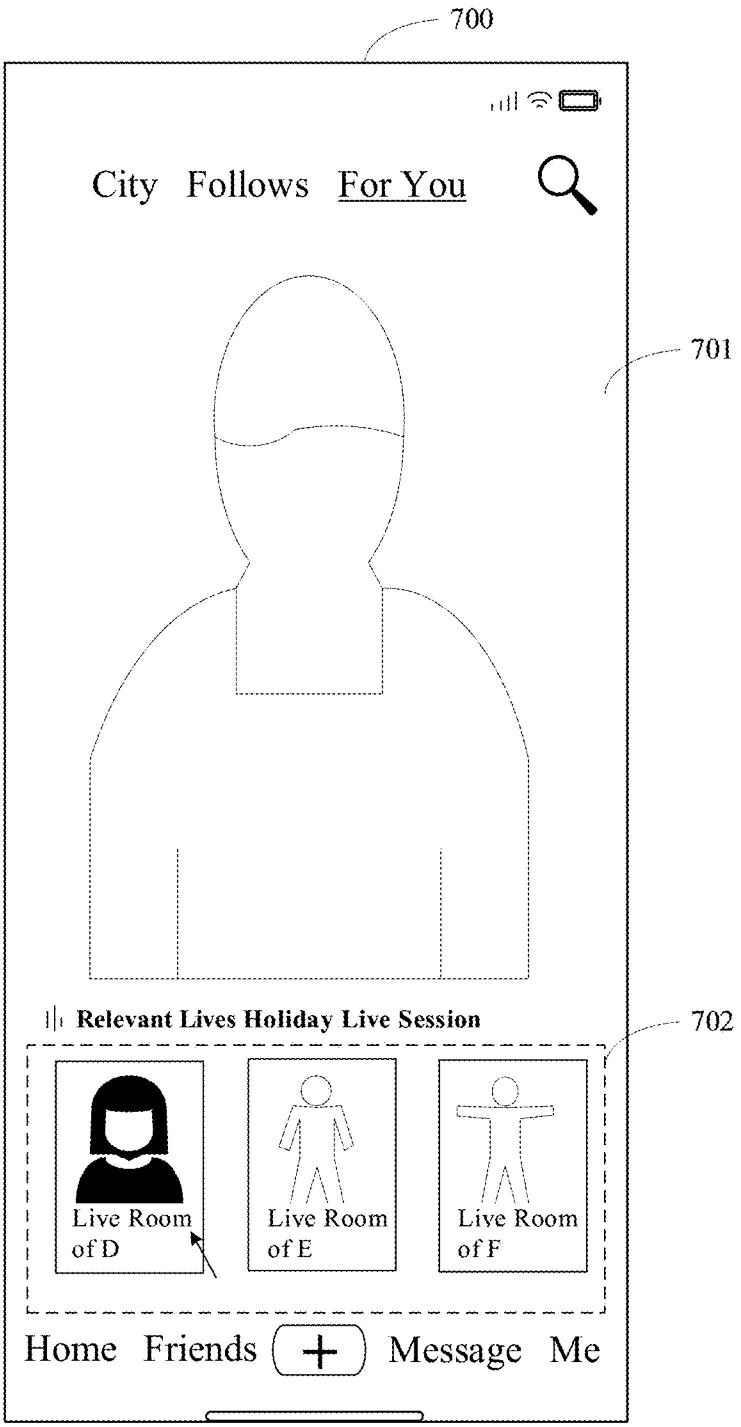
FIG. 7 is a schematic diagram of live cards provided by an embodiment of the present disclosure.

Exemplarily, FIG. 7 is a schematic diagram of a live card provided in an embodiment of the present disclosure. As shown in FIG. 7, an area 702 including three live cards is shown on the preview feed page 700. The preview feed page 700 can display a live preview video 701, and the three live cards in the area 702 can be arranged horizontally, each live card displaying information such as a live room cover, a host avatar, a host nickname, and a live room title corresponding to a first live room associated with the second live room. The three live room titles in the figure are "Live Room of D", "Live Room of E", and "Live Room of F". As an illustration, the area 702 is located at the bottom of the preview feed page 700.

Optionally, in response to a number of first live rooms associated with the second live room being greater than a predefined number, the live preview method further comprises: receiving a scrolling operation on the live cards and scrolling the display of the live cards.

Because the predefined number is the maximum number of live cards supported by the first page, if the number of first live rooms associated with the second live room exceeds the predefined number and a scrolling operation performed on the plurality of live cards is received from the user, the display of the live cards is scrolled to allow the user to view each live card. The above scrolling operation can correspond to the arrangement of live cards on the first page. If the live cards are arranged horizontally, the scrolling operation is a horizontal scrolling operation; and if the live cards are arranged vertically, the scrolling operation can be a vertical scrolling operation.

Optionally, after displaying live cards of the live first rooms associated with the second live room on the first page, the live preview method can further comprise: receiving a trigger operation on a live card of the one or more live cards of the first live rooms associated with the second live room; and displaying a live page of a live room corresponding to the triggered live card.

The trigger operation on a live card of a live room associated with the second live room can include a gesture control operation, a voice control operation, or a facial expression control operation performed by the user on the live card of any live room associated with the second live room, which is not specifically limited herein. In some embodiments, after the live cards of the live rooms associated with the second live room are displayed on the first page, the client can detect the user's trigger operation. When a trigger operation performed by the user on any live card is detected, the user can be directed to a live page displaying a live room, i.e., the user enters the live room to view the live content.

As an example, referring to FIG. 7, the arrow in FIG. 7 indicates the user's trigger operation on the first live card. Then, a live page similar to that shown in FIG. 5 can be displayed with a difference that in FIG. 7 this live page displays the live content of a live room corresponding to the first live card.

In the above scheme, in response to the additional content being live rooms associated with the second live room, live cards of the live rooms associated with the second live room can be displayed on the first page after the user triggers the triggering element corresponding to the additional content, allowing the user to quickly identify some live rooms associated with the current live room. Moreover, when the user triggers the live card of any one of the live rooms associated with the second live room, the user can quickly enter the live room, thereby improving the ability to deliver relevant live content in the feed scene and expanding the content and value of the live preview feed.

In the live preview scheme provided in the embodiment of the present disclosure, a live preview video is obtained and displayed on a first page, wherein the live preview video is generated based on live streaming and includes an triggering element corresponding to additional content associated with the live streaming; a trigger operation on the triggering element corresponding to the additional content is received to display the additional content. In the above technical solution, by adding an triggering element corresponding to the additional content in the live first page, it is possible to deliver additional content associated with the current live preview video, so as to expand the content displayed in the live preview feed, and allow users to browse more related content while watching the live preview video, and thereby improving the display effect of the live preview feed, satisfying users' related interest demands, and enhancing the live preview experience.

In some embodiments, after displaying the additional content, the live preview method may further comprise: receiving a return operation on the additional content and returning to the first page to continue displaying the live preview video.

The return operation can be set according to specific additional content. If the additional content is a historical predefined video clip, the return operation can be a trigger operation on a Return button on the predefined second page; if the additional content is an object, the return operation can be a close operation on the object detail page; if the additional content is a first live room associated with the second live room, the return operation can be a trigger operation on the blank area of the first page or a slide down operation.

In some embodiments, after displaying the additional content, when the client receives a return operation performed by the user on the additional content, it can close the page or card of the additional content and return to the first page to continue displaying the live preview video. This allows the user to view the relevant content of the live preview feed, but also to return to the live preview feed from the relevant content, which is more in line with the user's actual viewing needs and thus can improve the user experience.

In some embodiments, in response to the additional content comprising content of at least two content types and having different predefined display priorities, displaying the additional content comprises: displaying content with the highest display priority among the additional content according to the display priorities. Optionally, the at least two content types of the additional content can be ordered in descending order according to the predefined display priorities as follows: live room associated with the second live room, object, and historical predefined video clip.

The display priorities are a predefined display rule for the additional content including content of at least two content types, which can be set and adjusted according to the actual situation. In an embodiment of the present disclosure, if the additional content includes a historical predefined video clip, an object, and a first live room associated with the second live room, the first live room associated with the second live room has the highest display priority, followed by the display priority of the object, and the historical predefined video clip has the lowest display priority. The above display priority setting is an example only.

In some embodiments, in response to the additional content associated with the live streaming of a live room comprising two or more types of content that are assigned with display priorities, the live preview video may include only an triggering element corresponding to the content with the highest display priority, that is, the client may display an triggering element corresponding to the content with the highest display priority on the first page. When the user triggers the triggering element, the content with the highest display priority is displayed.

Exemplarily, if the at least two types of content included in the additional content arranged in descending order of predefined display priorities are live room associated with the second live room, object, and historical predefined video clip, only an triggering element corresponding to the first live room associated with the second live room can be displayed on the first page, and after receiving the user's trigger operation on the triggering element, the live card of the live room associated with the live streaming can be displayed on the first page.

In the above scheme, when the additional content associated with the live streaming includes a plurality of content types, display priorities can be set for these content types, and the content with the highest display priority can be displayed in the live preview feed scenario to maximize the display value of the live preview feed.

In the related art, users may leave a live room if they cannot be engaged by some highlights of the live room in the live preview feed scenario. The distribution and user reach of lives have real-time characteristics, and the real-time performance as the foundation characteristic of lives acting as carriers cannot be disrupted in the distribution chain, otherwise the live content cannot effectively reach the users; the live preview feed container in mixed streaming scenarios can only distribute single lives, and the limited number of lives cannot meet users' interest demands. When a user has some associated consumption demands in a live room, the associated demands may not be fully met due to a long active search path.

In the live preview method provided in the embodiment of the present disclosure, an triggering element corresponding to the additional content can be added in the live preview feed scenario to distribute more content related to this live, including highlights of the history content of the live, a preview of a next live in the e-commerce scenario, and/or other live rooms related to this live, so as to optimize the display effect of the live preview feed and increase the consumption value of the live preview feed, and thereby enhancing the user's sense of control over live content in mixed streaming scenarios, allowing users to fully experience the ecological diversity of live streaming, fully explore their interests, expand their field of vision, and fully satisfy their related interest demands.

Figure 8:
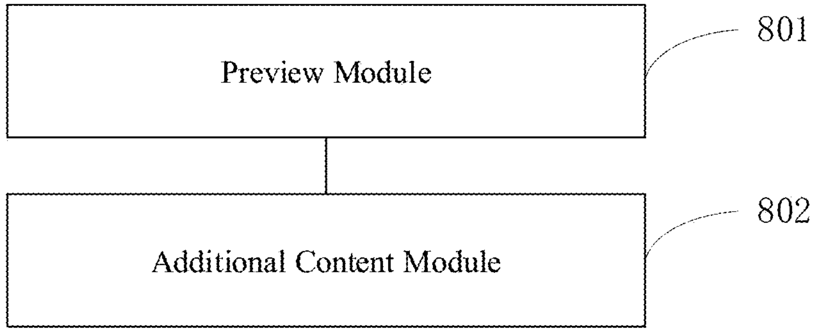
FIG. 8 is a schematic structural diagram of a live preview apparatus provided in an embodiment of the present disclosure.

FIG. 8 is a schematic structural diagram of a live preview apparatus provided in an embodiment of the present disclosure. The apparatus can be implemented by software and/or hardware, and can generally be integrated into an electronic device. As shown in FIG. 8, the apparatus comprises:

a preview module for displaying a live preview video on a first page, wherein the live preview video is generated based on live streaming, and the first page comprises a triggering element corresponding to additional content associated with the live streaming; and an additional content module 802 for receiving a trigger operation on the triggering element corresponding to the additional content and displaying the additional content.

Optionally, the additional content comprises at least one of a historical predefined video clip, an object, or a first live room associated with a second live room, wherein the second live room corresponds to the live streaming; and the triggering element corresponding to the additional content is identification information of the additional content, and identification information of different additional content is different.

Optionally, the additional content module 802 is used for:

playing the historical predefined video clip on a predefined second page in response to the additional content being the historical predefined video clip.

Optionally, the historical predefined video clip is a predefined video clip of the live streaming captured within a predefined historical time period prior to a current time.

Optionally, in response to multiple predefined video clips being within the predefined historical time period, the historical predefined video clip is a predefined video clip of the multiple predefined video clips closest to the current time.

Optionally, the apparatus further comprises a window module for, after playing the historical predefined video clip on the predefined second page, displaying a live preview window of the live room on the predefined second page to play the live preview video on the live preview window when playing an audio and a video of the historical predefined video clip on the predefined second page.

Optionally, the apparatus further comprises a first live module for receiving a trigger operation on the live preview window and displaying a live page of the second live room after displaying the live preview window of the second live room on the predefined second page.

Optionally, the additional content module 802 is used for:

displaying attribute information of the object on an object detail page in response to the additional content being the object, the attribute information comprising at least one of an image or an introduction text of the object.

Optionally, the additional content module 802 is used for:

in response to the additional content being one or more live rooms associated with the live streaming, displaying live cards of the one or more live rooms associated with the second live room on the first page.

Optionally, the apparatus further comprises a second live module for receiving a trigger operation on a live card of the one or more live cards of the live rooms associated with the second live room; and displaying a live page of a live room associated with the triggered live card.

Optionally, the apparatus further comprises a scroll display module for:

in response to a number of the at least one live room associated with the second live room being greater than a predefined number, receiving a scrolling operation on the live cards and scrolling the display of the live cards.

Optionally, the additional content module 802 is used for:

in response to the additional content comprising content of at least two pieces of content and having display priorities, displaying a piece of content with a highest display priority among the at least two pieces of content according to the display priorities.

The live preview apparatus provided in this embodiment of the present disclosure can perform the live preview method provided in any embodiment of the present disclosure, and has corresponding functional modules to implement the method and achieve the beneficial effect of the present disclosure.

An embodiment of the present application further provides a non-transitory computer program product containing a computer program/instructions that, when executed by a processor, implement the live preview method provided in any embodiment of the present disclosure.

Figure 9:
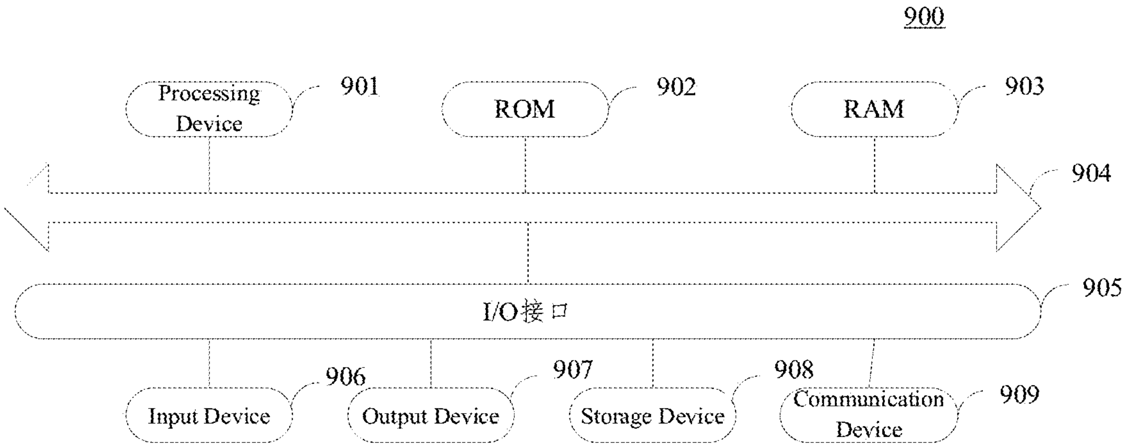
FIG. 9 is a schematic structural diagram of an electronic device provided by an embodiment of the present disclosure.

FIG. 9 is a schematic structural diagram of an electronic device provided by an embodiment of the present disclosure. Referring to FIG. 9, a schematic structural diagram of an electronic device 900 suitable for implementing the embodiments of the present disclosure is shown. The electronic device 900 of the embodiment of the present disclosure may include, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 9 is merely an example and should not impose any limitation on the function and scope of the embodiments of the present disclosure.

As shown in FIG. 9, the electronic device 900 may include a processing device (e.g., a central processing unit, a graphics processor) 901, which may perform various appropriate actions and processes according to a program stored in Read Only Memory (ROM) 902 or a program loaded from storage device 908 into Random Access Memory (RAM) 903. In RAM 903, various programs and data required for the operation of the electronic device 900 are also stored. Processing device 901, ROM 902 and RAM 903 are connected to each other through bus 904. An input/output (I/O) interface 905 is also connected to the bus 904.

Generally, the following devices can be connected to I/O interface 905: input devices 906 including, for example, a touch screen, a touch pad, a keyboard, a mouse, a camera, a microphone, an accelerometer, a gyroscope, etc.; output devices 907 including a liquid crystal display (LCD), a speaker, a vibrator, etc.; a storage device 908 such as a magnetic tape, a hard disk, etc.; and a communication device 909. The communication device 909 enables the electronic device 900 to communicate in a wireless or wired manner with other devices to exchange data. Although FIG. 9 shows the electronic device 900 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure includes a computer program product, which includes a computer program carried on a non-transitory computer readable medium, and containing program code for executing the method shown in the flowchart. In such an embodiment, the computer program may be downloaded and installed from the network through the communication device 909, or installed from the storage device 908, or from the ROM 902. When the computer program is executed by the processing device 901, the above functions defined in the live preview method of the embodiment of the present disclosure are performed.

It should be noted that the computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks include a local area network ("LAN") and a wide area network ("WAN"), the Internet, and end-to-end networks (for example, ad hoc end-to-end networks), as well as any currently known or future developed networks.

The above computer readable medium may be included in the electronic device described above; or it may exist alone without being assembled into the electronic device.

The computer readable medium carries one or more programs that, when executed by the electronic device, cause the electronic device to perform steps of: displaying a live preview video on a first page, wherein the live preview video is generated based on live streaming, and the first page comprises a triggering element corresponding to additional content associated with the live streaming; and receiving a trigger operation on the triggering element corresponding to the additional content and displaying the additional content.

The computer program code for executing operations of the present disclosure may be complied by any combination of one or more program design languages, the program design languages including object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of thereof. More specific examples of the machine-readable storage medium may include electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A live preview method, comprising:

displaying, during a live procedure of live streaming, a live preview video on a first page, wherein the live preview video is generated based on the live streaming, the first page comprises a triggering element corresponding to additional content associated with the live streaming, the additional content comprises product which will be introduced in the live streaming, and the triggering element corresponding to the product comprises identification information of the product;

receiving a trigger operation on the triggering element corresponding to the additional content and displaying the additional content; and displaying, in response to receiving a trigger operation on a live preview window, a live page of the live streaming, wherein the displaying the additional content comprises displaying attribute information of the product on a product detail page which is different from the first page in response to the additional content being the product, the attribute information comprising at least one of an image or an introduction text of the product, wherein the product detail page comprises at least one of a Purchase button, a Showcase button, a Customer Service button, or a Collection button, and comprises a window for displaying live content of the live streaming.

2. The live preview method according to claim 1, wherein:

the additional content further comprises at least one of a historical predefined video clip or a first live room associated with a second live room; and the triggering element corresponding to the additional content is identification information of the additional content, and identification information of different additional content is different.

3. The live preview method according to claim 2, wherein the displaying the additional content comprises:

playing the historical predefined video clip on a predefined second page in response to the additional content being the historical predefined video clip.

4. The live preview method according to claim 2, wherein the historical predefined video clip is a predefined video clip of the live streaming captured within a predefined historical time period prior to a current time.

5. The live preview method according to claim 4, wherein in response to multiple predefined video clips being within the predefined historical time period, the historical predefined video clip is a predefined video clip of the multiple predefined video clips closest to the current time.

6. The live preview method according to claim 3, further comprising:

after playing the historical predefined video clip on the predefined second page, displaying a live preview window of the second live room on the predefined second page to play the live preview video on the live preview window when playing an audio and a video of the historical predefined video clip on the predefined second page.

7. The live preview method according to claim 6, further comprising:

receiving the trigger operation on the live preview window and displaying a live page of the second live room after displaying the live preview window of the second live room on the predefined second page.

8. The live preview method according to claim 2, wherein the displaying the additional content comprises:

in response to the additional content being one or more live rooms associated with the live streaming, displaying live cards of the one or more live rooms associated with the second live room on the first page.

9. The live preview method according to claim 8, further comprising:

receiving a trigger operation on a live card of the one or more live cards of the live rooms associated with the second live room; and displaying a live page of a live room associated with the triggered live card.

10. The live preview method according to claim 8, further comprising:

in response to a number of the at least one live room associated with the second live room being greater than a predefined number, receiving a scrolling operation on the live cards and scrolling the display of the live cards.

11. The live preview method according to claim 1, wherein displaying the additional content comprises:

in response to the additional content comprising content of at least two pieces of content and having display priorities, displaying a piece of content with a highest display priority among the at least two pieces of content according to the display priorities.

12. An electronic device, comprising:

a memory for storing processor executable instructions; and a processor for reading the executable instructions from the memory and execute the instructions to implement a live preview method comprising:

displaying, during a live procedure of live streaming, a live preview video on a first page, wherein the live preview video is generated based on the live streaming, the first page comprises a triggering element corresponding to additional content associated with the live streaming, the additional content comprises product which will be introduced in the live streaming, and the triggering element corresponding to the product comprises identification information of the product;

receiving a trigger operation on the triggering element corresponding to the additional content and displaying the additional content; and displaying, in response to receiving a trigger operation on a live preview window, a live page of the live streaming, wherein the displaying the additional content comprises displaying attribute information of the product on a product detail page which is different from the first page in response to the additional content being the product, the attribute information comprising at least one of an image or an introduction text of the product, wherein the product detail page comprises at least one of a Purchase button, a Showcase button, a Customer Service button, or a Collection button, and comprises a window for displaying live content of the live streaming.

13. The electronic device according to claim 12, wherein:

the additional content further comprises at least one of a historical predefined video clip or a first live room associated with a second live room; and the triggering element corresponding to the additional content is identification information of the additional content, and identification information of different additional content is different.

14. The electronic device according to claim 13, wherein the displaying the additional content comprises:

playing the historical predefined video clip on a predefined second page in response to the additional content being the historical predefined video clip.

15. The electronic device according to claim 13, wherein the historical predefined video clip is a predefined video clip of the live streaming captured within a predefined historical time period prior to a current time.

16. The electronic device according to claim 15, wherein in response to multiple predefined video clips being within the predefined historical time period, the historical predefined video clip is a predefined video clip of the multiple predefined video clips closest to the current time.

17. The electronic device according to claim 14, wherein the processor is further configured to:

after playing the historical predefined video clip on the predefined second page, display a live preview window of the second live room on the predefined second page to play the live preview video on the live preview window when playing an audio and a video of the historical predefined video clip on the predefined second page.

18. The electronic device according to claim 17, wherein the processor is further configured to:

receive the trigger operation on the live preview window and display a live page of the second live room after displaying the live preview window of the second live room on the predefined second page.

19. A non-transitory computer-readable storage medium on which a computer program is stored, wherein the computer program is used to perform a live preview method comprising:

displaying, during a live procedure of live streaming, a live preview video on a first page, wherein the live preview video is generated based on the live streaming, the first page comprises a triggering element corresponding to additional content associated with the live streaming, the additional content comprises product which will be introduced in the live streaming, and the triggering element corresponding to the product comprises identification information of the product;

receiving a trigger operation on the triggering element corresponding to the additional content and displaying the additional content; and displaying, in response to receiving a trigger operation on a live preview window, a live page of the live streaming, wherein displaying the additional content comprises displaying attribute information of the product on a product detail page which is different from the first page in response to the additional content being the product, the attribute information comprising at least one of an image or an introduction text of the product, wherein the product detail page comprises at least one of a Purchase button, a Showcase button, a Customer Service button, or a Collection button, and comprises a window for displaying live content of the live streaming.

* * * * *